United States Patent [19]

Dethlefs et al.

[11] Patent Number: 4,898,773

[45] Date of Patent: Feb. 6, 1990

[54] PHOTOGRAPHIC PAPER SUPPORT WITH A WATER RESISTANT COATING OF POLYETHYLENE

[75] Inventors: Ralf-Burkhard Dethlefs, Bissendorf; Bernd Scholz, Osnabrück; Wolfram Wysk, Belm, all of Fed. Rep. of Germany

[73] Assignee: Felix Schoeller jr GmbH & Co. KG, Osnabrück, Fed. Rep. of Germany

[21] Appl. No.: 77,491

[22] Filed: Jul. 24, 1987

[30] Foreign Application Priority Data

Aug. 14, 1986 [DE] Fed. Rep. of Germany ....... 3627859

[51] Int. Cl.[4] ........................ B32B 27/08; B32B 27/32; G03C 1/76

[52] U.S. Cl. .................................... 428/332; 428/511; 428/516; 264/176.1; 430/523; 430/538; 430/950

[58] Field of Search ........................ 428/511, 332, 516

[56] References Cited

U.S. PATENT DOCUMENTS

| | | | |
|---|---|---|---|
| 4,433,030 | 2/1984 | Tamagawa et al. | 428/513 |
| 4,452,846 | 6/1984 | Akao | 428/516 |
| 4,678,742 | 7/1987 | Tamagawa et al. | 428/513 |

FOREIGN PATENT DOCUMENTS

| | | |
|---|---|---|
| 1112093K | 5/1968 | United Kingdom . |
| 2110116B | 6/1983 | United Kingdom . |

*Primary Examiner*—P. C. Ives

*Attorney, Agent, or Firm*—Horst M. Kasper

[57] ABSTRACT

A photographic paper support, which carries on both sides a water resistant coating of polyethylene, is disclosed. The polyethylene is a polyethylene of relatively low density of between 0.930 and 0.936 gram per cubic centimeter, which is produced according to high pressure polymerization. In particular, low density polyethylene (LDPE) produced according to the high pressure method with a density of 0.934 gram per cubic centimeter can be employed.

17 Claims, No Drawings

PHOTOGRAPHIC PAPER SUPPORT WITH A WATER RESISTANT COATING OF POLYETHYLENE

BACKGROUND OF THE INVENTION INCLUDING PRIOR ART

1. Field of the Invention

The invention relates to a photographic paper support with a water resistant coating of polyethylene.

2. Brief Description of the Background of the Invention Including Prior Art

Water resistant photographic paper supports comprise a photographic paper base with synthetic resin layers applied to both sides. The synthetic resins can comprise polyolefins such as polyethylene and can be applied onto the paper by an extrusion coating method. Alternatively, the synthetic resins can comprise an organic varnish or lacquer mixture, which is applied to the paper by a dipping or spraying process. These coatings are dried, solidified and stiffened with heat or a high energy radiation. After resin coating and further treating of the surface light sensitive coatings, which can be one or several layers and are normally based on a silver halide, are applied to the front side synthetic resin layer. The light sensitive layers can be either black and white photographic layers or color photographic layers.

The front side synthetic resin layer disposed under the light sensitive layers usually comprises light reflecting white pigments as well as possibly color pigments, optical brightening agents and/or additives such as anti-static agents, dispersing agents for the white pigment, anti-oxidizing agents, release agents, external lubricants and the like. In the following, the term auxiliary agents includes color pigments, optical brightening agents, anti-static agents, dispersing agents for a white pigment, anti-oxidizing agents, release agents and external lubricants.

The synthetic resin layer applied on the side of the paper base opposite to that used for receiving the light sensitive layers (back side coating) can contain or be free of pigments and/or it can contain other additives, which would correspond to the use and employment of the laminate in each case as a photographic support and which can in principle correspond to those additive agents employed in the front side coating.

The front side coating can have additional functional layers, which, for example, improve relevant properties such as the adhesion of a light sensitive layer.

The back side coating can further comprise additional functional layers, which, for example, improve the possibilities of writing on the surface, the anti-static properties, the sliding properties or the planarity of the laminate.

German Patent Application Laid Out No. 16 19 233 teaches the use of polyethylene mixtures for providing layers of tape shaped material with extruder coating. This reference teaches general background aspects of interest in connection with the present invention.

The coating of a photographic paper base with polyolefin by way of meltextrusion coating through a wide slot die is known in the art. For example, U.S. Pat. No. 3,411,908 teaches such a system as well as other aspects generally employed in the preparation of resin coated photographic paper. It is also known that certain difficulties occur in an extrusion system of polyethylene, which can lead to substantial interferences, disturbances or even to unsuitability of the resulting photographic paper support material in view of the high sensitivity of photographic processes.

Disadvantages occur in particular in the case of polyethylene of low density. Such disadvantages include in particular an increased tendency for adhesive attachment of the layers when the paper is wound up onto a roll. Further, in the case of glossy surfaces, specks and so-called "secondary pits", are generated due to the high pressure inside the paper roll and upon separation of the layers during unwinding. Secondary pits are indentations originating from the contact of a rough back surface with a glossy front side. A further disadvantage is observed in an insufficient stiffness of the product.

Disadvantages occur even when employing polyethylenes of higher densities (HDPE). In particular, substantially decreased adhesion strength of the paper base, caused by the higher melt viscosity and the higher crystallinity of the resin in the coating, is observed. These disadvantages can be corrected within limits by increased extruder temperatures and/or lower operating speeds of the production machines.

Further disadvantages of the high density polyethylene (HDPE) as compared with the low density polyethylene (LDPE) include increased inhomogenities, so called gel-particles, which are small but clearly visible agglomerates of cross-linked or coagulated high molecular parts of the polyethylene as well as the requirement for additives needed to counteract the catalyst residues in the HD-polyethylene.

In addition, high density polyethylene cannot be extended and stretched to layer thicknesses of from about 10 to 50 micrometers at the desired higher operating speeds. Otherwise, defects, imperfections and holes occur in the molten film. Secondary disturbances due to increased extruder temperatures include, for example, dark colored particles that are generated by degraded, decomposed, disintegrated or burnt polyethylene. Furthermore, agglomerates, the called gel-particles, pinholes, pits or specks result in disturbances during application of light sensitive silver halide emulsions. These appear in the developed photograph as areas of decreased, changed or completely lacking black or, respectively, color density. Catalyst residues in the polyethylene can further influence the sensitivity of photographic layers, and this can become visible only after an extended storage time. In order to limit the disadvantages that are particularly caused because of the use of the high density polyethylene (HDPE), one can employ mixtures of low density polyethylene (LDPE) and high density polyethylene (HDPE).

The density range of the polyethylene types employed is for low density polyethylene (LDPE), between from about 0.914 and 0.926 gram per cubic centimeter, and for high density polyethylene (HDPE), between from about 0.950 to 0.965 gram per cubic centimeter. Mixing these types allows the setting of nearly any density value desired (DAS 1619233).

Despite the mixing of the two polyethylene types, the problems, which are in particular associated with the high density polyethylene (HDPE), cannot be fully eliminated. In this category fall the gel-particles and other agglomerates formed, as well as the catalyst residues present in the high density polyethylene (HDPE) and their photochemical effects. A further disadvantage of both the low density polyethylene (LDPE) and of the high density polyethylene (HDPE) types, as well as mixtures therefrom, is that a possible content in whitening agent or white pigment, usually titanium dioxide $TiO_2$, is limited to about 12 weight percent unless substantially more difficult processing conditions are accepted.

SUMMARY OF THE INVENTION

1. Purposes of the Invention

It is an object of the invention to avoid the disadvantages associated with the use of high density polyethylene in the preparation of photographic paper supports.

It is another object of the present invention to provide a coating material for a photographic paper base that allows fast processing speeds of the paper and provides at the same time a coating of improved quality.

It is a further object of the present invention to provide a photographic paper support that is coated with a polyethylene without generation of specks and secondary pits during storage of the photographic paper support in rolls.

These and other objects and advantages of the present invention will become evident from the description which follows.

2. Brief Description of the Invention

The present invention provides a photographic paper support comprising a photographic paper base with a water resistant polyolefin coating that includes a high pressure polyethylene having a density of from about 0.930 to 0.936 gram per cubic centimeter and containing in the molecular structure between 5 and 12 methyl-groups per 1000 carbon atoms. Particularly suitable for the extrusion coating process are polyethylenes having a melt flow index (MFI) of between 1 and 25 dg/min. The water resistant coating can further include a polyethylene having a density of from about 0.914 to 0.926 gram per cubic centimeter if the high pressure polyethylene having a density of from about 0.930 to 0.936 gram per cubic centimeter is present in the coating in an amount of at least 10 weight percent of the coating. Preferably the specific high pressure polyethylene is present in an amount of at least 50 weight percent of the coating. More preferably, the specific high pressure polyethylene is present in an amount of at least about 90 weight percent of the coating.

The said high pressure polyethylene forming part of the coating preferably has a density of from about 0.933 to 0.935 gram per cubic centimeter and preferably is present in the coating in an amount of at least about 60 weight percent of the coating.

A whitening pigment can be dispersed in the coating in an amount of up to about 20 weight percent. For improving the qualities desired for a photographic paper support, there can also be dispersed in the coating an auxiliary agent positively influencing properties related to application of the photographic paper support in a photographic material such as any or all of the following: a coloring agent, an optical brightener agent, a stabilizer agent, an anti-oxidizing agent.

Another aspect of the present invention provides a method for producing a photographic paper support which comprises the following. A composition containing the said high pressure polyethylene having a density of from about 0.930 to 0.936 gram per cubic centimeter is prepared, melt extrusion coated onto at least one side of a photographic paper base and finished in the laminator to a mat or glossy surface. The said high pressure polyethylene can be coated onto both sides of the photographic paper base.

A uniform corona pretreatment can be applied to the photographic paper base before extrusion coating the polyethylene.

The said high pressure polyethylene can be present in the coating in an amount of at least about 10 percent by weight. Preferably the said high pressure polyethylene is present in the coating in an amount of at least about 50 percent by weight and more preferably is present in an amount of at least about 90 percent by weight.

The novel features which are considered as characteristic for the invention are set forth in the appended claims. The invention itself, however, both as to its construction and its method of operation, together with additional objects and advantages thereof, will be best understood from the following description of specific embodiments.

DESCRIPTION OF INVENTION AND PREFERRED EMBODIMENT

In accordance with the present invention, there is provided a photographic paper support with a water resistant and a water repellant coating of a polyolefin. The polyolefin employed is polyethylene produced by a high pressure polymerisation and having a density of from about 0.930 to 0.936 gram per cubic centimeter. The high pressure polyethylene can be mixed with usual polyethylene types including low density polyethylene and possibly a limited amount of high density polyethylene. The high pressure polyethylene preferably has a density of about 0.934 grams per cubic centimeter. A whitening agent or a white pigment is preferably contained in the polyethylene in an amount of up to about 20 weight percent. Furthermore, it may be advantageous to add auxiliary materials, which enhance the properties required for a photographic support such as coloring agents, optical brighteners, stabilizers and anti-oxidizing agents.

It was surprising and not foreseeable that even those properties important for the applications of the photographic paper support particularly those relating to the stiffness of the photographic paper support, which were formerly obtained only by use of high density polyethylene, are now fully obtained by employing the high pressure polyethylene according to the present invention. Furthermore, the use of the said high pressure polyethylene results in a substantially decreased content in gel particles and in an improved adhesion to the base paper. At the same time, good stiffness values are obtained and in addition specks or so-called secondary pits are not present. In comparison with conventional polyethylene, the dispersion of pigments such as titanium oxide is improved to the extent that the content of titanium oxide can be increased to about 20 weight percent.

The testing of the improved properties in situ and during production is associated with substantial difficulties, particularly for obtaining quantitative measurements.

One parameter that is of interest is the separating force required to separate the polyethylene coating from the photographic paper base. This could be standardized for example and measured in dimensions such as grams per 10 millimeter width. However, there is a problem that in cases of good adhesion the measurement does not determine the force of separation but the ply bond strength of the paper.

In order to obtain some comparison values, the following steps were employed.

The polyethylene layer on the photographic paper base was cut in grid shape. An adhesive tape was attached with the adhesive side on a grid location and after the removal of the adhesive tape, it was determined how the polyethylene was attached. In this case the location of separation and ripping off was visually inspected in view of a determination of a ripping of fibers, and the adhesion was denoted in five stages that are defined in the following.

This method can be considered as a modification of the grid cut method, which is described as the "Gitterschnittmethode" in the German Industrial Standard DIN 53151. The grades denote the following:

Grade 1: in 100% of the separated polyethylene surface, a ripping of fibers occurs in the paper, that is, the polyethylene adhesion is higher than the internal strength and stability of the paper.

Grade 2: in small regions (up to about 20% of the surface) the polyethylene separates from the surface of the paper, a ripping of the fibers thus does not occur in these regions.

Grade 3: in 20 to 50 % of the surface, the polyethylene separates without a ripping of fibers of the paper surface.

Grade 4: more than 50 % of the surface of the photographic paper base is separated from the polyethylene coating without observation of a ripping of fibers.

Grade 5: the polyethylene can be pulled off fully and without a ripping of fibers from the paper surface.

In the table given below, the adhesion of polyethylene coating film on the photographic paper base was determined by pulling off a 10 millimeter wide polyethylene strip in the machine direction. The grades given were the grades 1 to 5 where grade 1 denotes a very good adhesion. The stiffness indicated for the paper coated with polyethylene was determined according to the Scandinavian Industrial Standard, Norm Scan. P 29:69.

Another parameter important in the consideration of the quality is the level of specks and secondary pits. This can be determined by a simple visual counting of such defects, which are visible in reflected or in grazing light.

The various polyethylenes can be distinguished in various ways. One method of distinguishing includes the determination of the number of methyl groups for each thousand carbon atoms. This number can be determined with infrared spectroscopy and is from about 5 to 12 for the high pressure polyethylene employed according to the present invention. This number is different from that of individual high density polyethylene and low density polyethylene. However, mixtures of these components having an average density of about 0.934 grams per cubic centimeter can have average numbers of methyl groups in the same range for the mixture. However, the number of methyl groups for the individual components is clearly different from that of the high pressure polyethylene employed according to the present invention.

Low density polyethylene can be defined according to the German Industrial Standard DIN 7728 T1 of April 1978. This is a polyethylene prepared by a high pressure method. High density polyethylene can be defined according to German Industrial Standard DIN 7728 T1 of April 1978. HDPE is polyethylene prepared according to a low pressure method. Low density polyethylene can have a density of 0.918 to 0.913. The range of average molecular weights can be from 20,000 to 50,000 atomic weight units. The melt flow index according to German Industrial Standard 53735 page 35, 447 can be 20- 0.1. The shape of the molecule is branched and has average chain length. The degree of crystallization can be from 40 to 55 percent. High density polyethylene or hard polyethylene can have a raw density of from about 0.935 to 0.97. This material can have molecules in the region from about 250,000 to 1,000,000 atomic weight units. The melt flow index MFI according to German Industrial Standard DIN 53735, pages 35, 437 can be from 8 to less than 0.01. The shape of the molecules is substantially linear and a longer chain length occurs. Crystallization degree is from 60 to 80 percent.

The ash contents of high density polyethylene with a density of 0.95 to 0.975 can be from about 0.01 to 0.03 percent. The ash content for conventional low density polyethylene types can have values of less than 10 parts per million. The ash contents of the polymers employed according to the present invention having a density of 0.93 to 0.936 can have a value of less than 10 parts per million.

Thus the polyethylene according to the present invention is preferably material having a density of 0.930 to 0.936, a content of from five to twelve methyl groups and preferably 6 to 10 methyl groups for each 1000 carbon atoms and an ash content of less than 10 parts per million. The MFI melt flow index values are preferably between 1.5 and 30. The finished coating material of course can contain additional ash generating materials such as for example titanium dioxide, aluminum or zinc stearate, cobalt blue and the like.

The following examples set forth preferred embodiments of the invention.

EXAMPLE 1

A high pressure polyethylene (LDPE) according to the invention with a density of about 0.934 grams per cubic centimeter was extrusion coated to a layer thickness of in each case 30 micrometers on both sides of a sized photographic paper base having a basis weight of 170 grams per square meter with a coating speed of 100 meters per minute. Furthermore, the paper base was subjected to a corona-pretreatment before the extrusion coating.

EXAMPLE 2 (Comparison)

The same conditions were applied as set forth in Example 1, but instead, as a comparison, a polyethylene mixture of 60 weight percent low density polyethylene (LDPE) with a density of 0.917 gram per cubic centimeter and 40 weight percent high density polyethylene (HDPE) with a density of 0.960 gram per cubic centimeter was applied. The mixture had a density of 0.934 gram per cubic centimeter. The photographic paper base was the same as that employed in Example 1.

EXAMPLE 3

Under the same conditions as set forth in Example 1, a polyolefin mixture comprising low density polyethylene including 65 weight percent of low density polyethylene according to the invention with a density of 0.934 gram per cubic centimeter and 35 weight percent of low density polyethylene with a density of 0.917 gram per cubic centimeter was used and applied to the corresponding photographic paper base.

EXAMPLE 4 (Comparison)

As a comparison, a polyethylene mixture of 75 weight percent low density polyethylene (LDPE) with a density of 0.917 grams per cubic centimeter and 25 weight percent high density polyethylene (HDPE) with a density of 0.960 grams per cubic centimeter was prepared and applied to a photographic paper base.

Both of the polyethylene mixtures of Example 3 and Example 4 had a density of 0.928 grams per cubic centimeter.

EXAMPLES 5 TO 8

The polyethylenes of Examples 1 to 4 were used respectively in the Examples 5 to 8. However, the polyethylene was mixed with ten weight percent of titanium dioxide of rutile structure and then applied under the same conditions to the photographic base paper.

EXAMPLE 9

The polyethylene of Example 1 was mixed with 18 weight percent of titanium oxide of rutile structure and then applied under the some conditions to the photographic base paper.

The results of Examples 1 to 9 are shown in the Table.

It will be understood that each of the elements described above, or two or more together, may also find a useful application in other types of water resistant coating configurations and processing procedures differing from the types described above.

While the invention has been illustrated and described as embodied in the context of a photographic paper support with a water resistant coating of polyethylene, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

TABLE

| Example | gel | Number of Particles | Level of gel particles | Adhesion to Paper | Stiffness (mN) | Average density of the Polyethylene compound ($g/cm^3$) |
|---|---|---|---|---|---|---|
| 1 | without $TiO_2$ | 0 | low | 1 | 371 | 0.934 |
| 2 C | without $TiO_2$ | 6 | high | 3 | 378 | 0.934 |
| 3 | without $TiO_2$ | 1 | low | 1 | 367 | 0.928 |
| 4 C | without $TiO_2$ | 4 | medium | 2 | 365 | 0.928 |
| 5 | with $TiO_2$ | 1 | low | 1 | 377 | 0.934 |
| 6 C | with $TiO_2$ | 8 | high | 3 | 378 | 0.934 |
| 7 | with $TiO_2$ | 2 | low | 1 | 375 | 0.928 |
| 8 C | with $TiO_2$ | 6 | high | 3 | 375 | 0.928 |
| 9 | with $TiO_2$ | 2 | low | 1 | 378 | 0.934 |

What is claimed as new and desired to be protected by Letters Patent is set forth in the appended claims.

1. A coated paper support material for photographic layers comprising
   - a photographic paper base having two sides;
   - a water resistant coating of a polyolefin disposed on each of the two sides of the photographic paper base, where one of the two water resistant coatings includes a high pressure polyethylene having a density of from about 0.930 to 0.936 gram per cubic centimeter and containing from about 5 to 12 methyl groups for each 1000 carbon atoms.

2. The photographic paper support according to claim 1 wherein the water resistant coating further includes a polyethylene having a density of from about 0.914 to 0.926 gram per cubic centimeter and where the high pressure polyethylene having a density of from about 0.930 to 0.936 gram per cubic centimeter is present in the coating in an amount of at least 10 weight percent of the coating.

3. The photographic paper support according to claim 1 wherein the water resistant coating further includes a polyethylene having a density of from about 0.914 to 0.926 gram per cubic centimeter and where the high pressure polyethylene having a density of from about 0.930 to 0.936 gram per cubic centimeter is present in the coating in an amount of at least 50 weight percent of the coating.

4. The photographic paper support according to claim wherein the water resistant coating further includes a polyethylene having a density of from about 0.914 to 0.926 gram per cubic centimeter and where the high pressure polyethylene having a density of from about 0.930 to 0.936 gram per cubic centimeter is present in the coating in an amount of at least about 90 weight percent of the coating.

5. The photographic paper support according to claim 1 wherein the high pressure polyethylene forming part of the coating has a density of from about 0.933 to 0.935 gram per cubic centimeter and where the high pressure polyethylene is present in the coating in an amount of at least about 90 weight percent of the coating.

6. The photographic paper support according to claim 1 further comprising a whitening pigment dispersed in the coating in an amount of up to about 20 weight percent, relative to the coating weight.

7. The photographic paper support according to claim 1 further comprising a coloring agent dispersed in the coating for improving properties relating to a photographic paper support.

8. The photographic paper support according to claim 1 further comprising an optical brightener dispersed in the coating for improving properties relating to a photographic paper support.

9. The photographic paper support according to claim 1 further comprising a stabilizer agent dispersed in the coating for improving properties relating to a photographic paper support.

10. The photographic paper support according to claim 1 further comprising an anti-oxidizing agent dispersed in the coating for improving properties relating to a photographic paper support.

11. A photographic paper support with a water resistant coating of a polyethylene wherein the improvement comprises that the polyethylene includes a high pressure polyethylene having a density of from about 0.930 to 0.936 gram per cubic centimeter applied in a thickness of from about 10 to 60 micrometers suitable for a photographic paper.

12. The photographic paper support according to claim 11 where the polyethylene employed for a water resistant coating is a high pressure polyethylene having a density of about 0.934 gram per cubic centimeter.

13. The photographic paper support according to claim 11 where the coating containing high pressure polyethylene further comprises a whitening pigment in an amount of up to about 20 percent by weight of the coating.

14. The photographic paper support according to claim 11 where the coating containing high pressure polyethylene further comprises an auxiliary agent positively influencing properties related to application of the photographic paper support in a photographic material.

15. A photographic support material comprising a photographic paper base a water resistant coating of a polyolefin disposed on at least one side of the photographic paper base, where the water resistant coating includes a high pressure polyethylene having a density of from about 0.930 to 0.936 $g/cm^3$ and containing in its molecular structure between 5 to 12 methyl groups per 1000 carbon atoms.

16. A photographic support material according to claim 15 wherein the polyolefin layer of the water resistant coating has an ash content of less than 10 parts per million.

17. A polyolefin coated paper support material for photographic layers comprising a photographic paper base and an extrusion coated polyolefin layer on each surface of the paper base wherein at least one of the layers includes a polyethylene manufactured according to the high pressure polymerization process and having a density between 0.930 and 0.936 $g/cm^3$ and containing from 5 to 12 methyl groups for each 1000 carbon atoms and which is present in the layer in an amount of at least 10 weight percent of the weight of the coating.

* * * * *